UNITED STATES PATENT OFFICE.

BERNHARD PRIEBS AND OSKAR KALTWASSER, OF BERLIN, GERMANY, ASSIGNORS TO THE ACTIEN-GESELLSCHAFT FÜR ANILIN FABRIKATION, OF SAME PLACE.

BLACK SULFUR DYE.

SPECIFICATION forming part of Letters Patent No. 655,659, dated August 7, 1900.

Application filed March 8, 1900. Serial No. 7,822. (Specimens.)

*To all whom it may concern:*

Be it known that we, BERNHARD PRIEBS and OSKAR KALTWASSER, of Berlin, in the Kingdom of Prussia, German Empire, have invented new and useful Improvements in the Production of Black Dyes; and we do hereby declare that the following is a full, clear, and exact description thereof, which will enable others skilled in the art to which it appertains to make and use the same.

Several attempts have been made in order to transform dinitrophenol 1:2:4 by the action of sulfur and alkali sulfids into black coloring-matters which dye cotton directly. In the English specification No. 19,831/96 the production of a black dyestuff has been described by melting dinitrophenol 1:2:4 with at least two parts of sulfur and five parts of sulfids of alkali metals. According to the statements of the above specification it is absolutely necessary to leave these proportions unchanged, especially to add at least two parts of sulfur, as otherwise a brown dyestuff instead of a black one will be obtained. Another black sulfureted dyestuff from dinitrophenol 1:2:4 is produced, according to the United States Letters Patent No. 618,152, by melting the nitro body with but a small quantity of sulfur—about one-fourth part of its weight—on addition of sulfids of alkali metals. The black coloring-matter thus formed is characterized by its solubility in an acid solution of bichromate of potash.

We have now prepared a new valuable black dye, the production of which is based on the most unexpected observation, that even on boiling with an aqueous solution of sulfids of alkali metals and sulfur dinitrophenol yields a dye which produces on unmordanted cotton black shades of great intensity.

The production of our new dye by simply boiling the components in an aqueous solution is a great technical advantage, because we may carry out the formation of the dyestuff at a very much lower temperature than has been described up to the present for the production of sulfureted dyes. Moreover, the mixture remains liquid from beginning to end, and the reaction may therefore be supported by continual stirring, which would not be possible if the product of the reaction formed a thick and, finally, almost solid melt. Further, all the inconveniences and even dangers connected with the manipulation of a melt caused by the presence of alkali sulfid and sulfureted hydrogen are avoided in the production of our new dye, the latter being directly obtained in the form of an aqueous solution, from which it can easily be isolated without any trouble.

For the production of our new dye in the manner referred to we, further, are not limited to employ at least two parts of sulfur. Contrary to the process described in the English Patent No. 19,831/96, the resulting dyestuff is the same whether we use two or even only one part of sulfur or if we reduce within certain limits the quantities of alkali sulfids employed.

As already stated, we obtain by our boiling process a new dyestuff which essentially differs from the products already known, as mentioned in the beginning.

Our new dye produces directly on cotton deep black shades, whereas the coloring-matter described in the English specification No. 19,831/96 and also the dyestuff described in the United States Letters Patent No. 618,152 yield on cotton only shades of slight intensity.

Our new product is further distinguished from the dye claimed in the last-mentioned United States patent by its insolubility in an acid solution of bichromate of potash.

In order to carry out practically our invention, we proceed as follows: Thirty parts, by weight, of dinitrophenol (1:2:4) are boiled for about fifteen hours with one hundred and twenty parts of sodium sulfid, forty-five parts of sulfur, and sixty parts of water in a vessel connected with a reflux-condenser. From the dark-colored solution obtained the dyestuff is precipitated either by addition of mineral acids or by introduction of a current of air, and the precipitate obtained is separated from the mother-liquor by filtration and evaporated to dryness on addition of sodium sulfid. The precipitate obtained, as described before, may also be directly pressed and dried and forms then a black powder almost insoluble in water, which before dyeing must be dissolved in water on addition of alkali sulfid.

The new dye is readily soluble in water containing sodium sulfid with blue-black to green-black color, which on addition of caustic soda-lye turns more bluish. Mineral acids and acetic acid produce in this solution a green-black precipitate. By introducing a current of air into the solution of the dye a dark-colored precipitate is soon formed, the solution becoming decolored. This precipitate is not redissolved when the introduction of the current of air is continued, even for about twelve hours.

The dye is insoluble in alcohol, scarcely soluble in cold sulfuric acid, but soluble with dirty green-blue color if the mixture with sulfuric acid is gently heated. On further heating the color of this solution turns black-blue.

Fuming sulfuric acid of about twenty-five per cent. anhydrid dissolves the dye with black-blue color. By adding ice to this solution a green-black precipitate is formed. When heated with caustic soda-lye and zinc-dust, the solution of the dye becomes dissolved, a leuco compound being formed which is very easily reoxidizable.

The new dye produces directly on unmordanted cotton black shades of remarkable intensity and fastness.

Having now described our invention and in what manner the same is to be performed, what we claim as new is—

The black dye produced by boiling dinitrophenol (1:2:4) with an aqueous solution of alkali sulfids and sulfur, said dye being insoluble in alcohol or acid solutions of bichromate of potash, readily soluble in water containing alkali sulfid with a greenish blue-black color which on addition of caustic soda-lye turns more bluish; the dye being precipitated from its aqueous solution by means of mineral acid, acetic acid, or carbonic acid in the form of a dark-colored precipitate; the solution of the dye yielding by introduction of a current of air a dark-colored precipitate and a decolored solution; the precipitate not being redissolved when the introduction of air is continued for some time; the dye being scarcely soluble in concentrated sulfuric acid in the cold, more readily on gently heating with dirty blue-green color, which on further heating turns black-blue; being soluble in fuming sulfuric acid of twenty-five per cent. $SO_3$ with black-blue coloration, this solution yielding a green-black precipitate on dilution with ice or ice-water; the new coloring-matter dyeing cotton directly deep black shades.

In witness whereof we have hereunto signed our names, this 21st day of February, 1900, in the presence of two subscribing witnesses.

BERNHARD PRIEBS.
OSKAR KALTWASSER.

Witnesses:
WOLDEMAR HAUPT,
HENRY HASPER.